(12) United States Patent
Gloor

(10) Patent No.: US 7,434,539 B2
(45) Date of Patent: Oct. 14, 2008

(54) WASTE DISPOSAL SYSTEM

(75) Inventor: Theodore R. Gloor, Overland Park, KS (US)

(73) Assignee: Epic Pets Incorporated, Overland Park, KS (US)

( * ) Notice: Subject to any disclaimer, the term of this patent is extended or adjusted under 35 U.S.C. 154(b) by 119 days.

(21) Appl. No.: 11/652,944

(22) Filed: Jan. 12, 2007

(65) Prior Publication Data

US 2007/0163508 A1 Jul. 19, 2007

Related U.S. Application Data

(60) Provisional application No. 60/759,156, filed on Jan. 13, 2006.

(51) Int. Cl.
*A01K 29/00* (2006.01)
(52) U.S. Cl. .................. 119/165; 119/167; 119/169
(58) Field of Classification Search ............. 119/161, 119/165, 166, 167, 168, 169, 170, 479
See application file for complete search history.

(56) References Cited

U.S. PATENT DOCUMENTS

| 4,117,555 | A |   | 10/1978 | Dennis |         |
|-----------|---|---|---------|--------|---------|
| 4,649,578 | A | * | 3/1987  | Vargo  | 119/161 |
| 4,979,469 | A |   | 12/1990 | Clark  |         |
| 6,079,363 | A |   | 6/2000  | MacLaine |       |
| 6,408,790 | B1| * | 6/2002  | Maguire | 119/166 |
| 6,913,116 | B2|   | 7/2005  | Lee    |         |
| 2004/0011297 | A1 |  | 1/2004 | Hochman |       |
| 2005/0081793 | A1 | * | 4/2005 | Sannikka | 119/165 |
| 2006/0037549 | A1 | * | 2/2006 | Kim    | 119/166 |

OTHER PUBLICATIONS

Indoor dog potty by The Cosmopolitan Canine, website located at www.cosmopolitancanine.com/products.htm, accessed Jan. 29, 2007.
"The Pet Loo" by Critter Cottage, website located at www.crittercottage.com.au/product.aspx?id=119, accessed Jan. 29, 2007.
Dog potty by Patio Park, Inc., website located at www.patiopark.com/index.htm, accessed Jan. 29, 2007.
Indoor Dog Potty by Wizdog, website located at www.wizdog.net, accessed Jan. 29, 2007.
Pet Patio Potty by Doggy Solutions, website located at www.doggysolutions.com/doglitterbox.htm, accessed Jan. 29, 2007.
Dog potty by Pooch potty, websited located at www.poochpotty.com, accessed Jan. 29, 2007.
The Pet Potty, website located at www.thepetpotty.net, accessed Jan. 29, 2007.

* cited by examiner

*Primary Examiner*—T. Nguyen
(74) *Attorney, Agent, or Firm*—Mark E. Brown

(57) ABSTRACT

A waste disposal system includes a receptacle with a base adapted to receive a waste tray assembly on a top panel thereof. The top panel includes an inlet drain opening. A discharge drain is provided in the receptacle base. The waste tray assembly can include natural or artificial turf, and is removable from the top panel. A cover can be mounted on the receptacle base and can be movable between open and closed positions. Alternatively, a lid can be provided for removably mounting on the receptacle base.

1 Claim, 13 Drawing Sheets

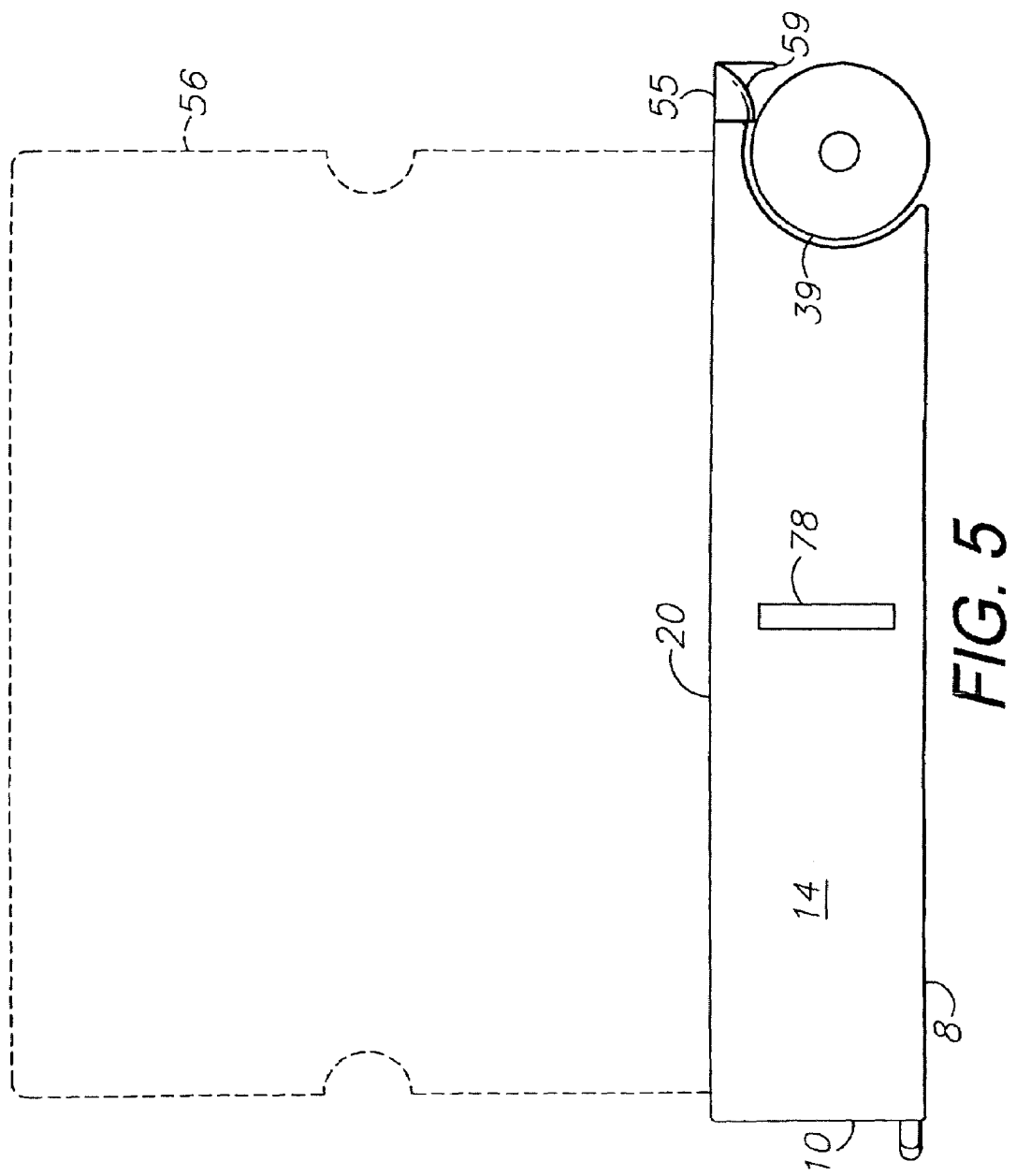

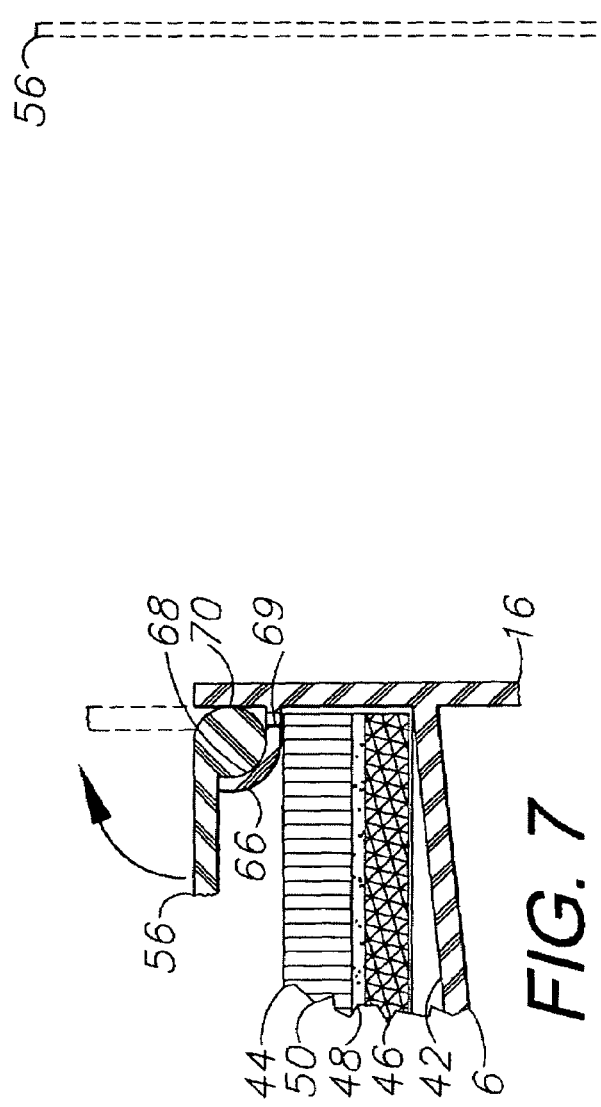
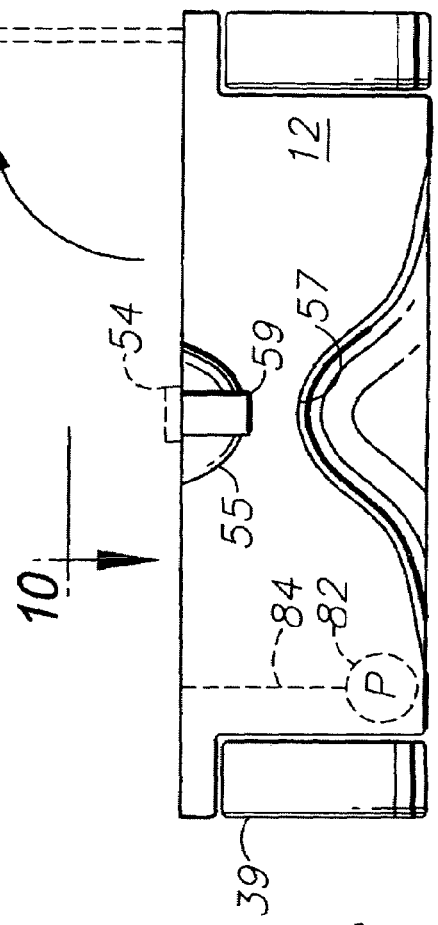
FIG. 7
FIG. 6

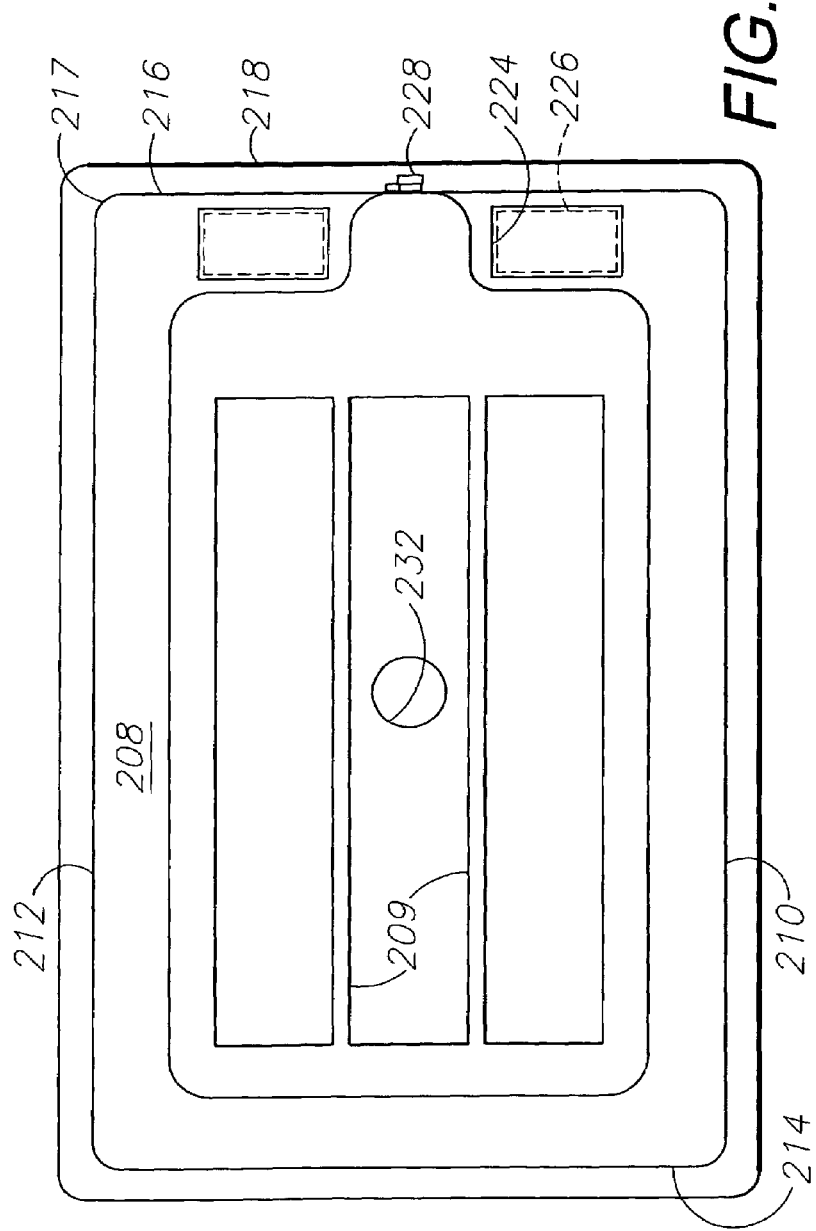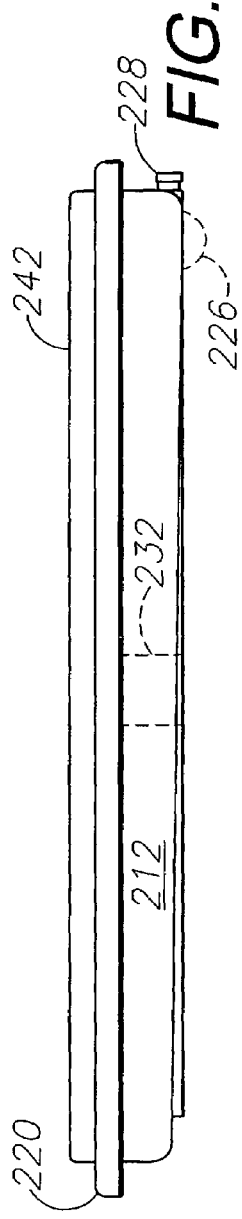
FIG. 15
FIG. 16

WASTE DISPOSAL SYSTEM

CROSS-REFERENCE TO RELATED APPLICATION

This application claims priority in U.S. Provisional Patent Application No. 60/759,156, filed Jan. 13, 2006, which is incorporated herein by reference.

BACKGROUND OF THE INVENTION

1. Field of the Invention

The present invention relates generally to waste receptacles, and in particular to an enclosable waste receptacle which is particularly adapted for use by small domestic animals.

2. Description of the Related Art

Domestic companion animals, particularly dogs and cats, are very popular among pet owners. However, waste handling is an unpleasant but significant aspect of pet ownership. Urban pet owners who live in apartments and high-rise dwelling structures and owners who travel with their pets are frequently inconvenienced by waste-handling responsibilities. Such inconveniences can involve the need to let the pets out of the dwelling structures according to predetermined schedules. Such pet toilet needs can arise at inopportune times for the owners. Thus, owners may find themselves disengaging from business and personal matters and otherwise arranging their schedules in order to let their pets out and/or take them on walks for toilet purposes.

Another alternative solution to pet waste problems consists of pet waste receptacles, which can be used indoors. Previous configurations of pet waste receptacles include "litter boxes", which generally absorb waste in dry litter material. The litter material must be frequently changed to avoid odor and related problems associated with accumulating waste material in open containers. Moreover, litter material can be scattered from an open container and must be collected to maintain a clean residence while coexisting with a pet trained or "house broken" for litter box use. Yet another prior art alternative consists of waste-absorbent paper pellets and pads. However, such disposable paper products tend to be somewhat cumbersome to handle and can be somewhat costly, particularly when they are replaced frequently.

Other prior art devices for collecting pet waste are shown in the Dennis U.S. Pat. No. 4,117,555; the Clark U.S. Pat. No. 4,979,469 and the Hochman U.S. Patent Publication No. 2004/0011297. Heretofore there is not been available a pet waste receptacle with the advantages and features of the present invention.

SUMMARY OF THE INVENTION

A waste receptacle is provided, which includes a receptacle base with a top panel mounting an inlet drain assembly. The drain assembly includes a drain plug movable between open and closed positions. A turf assembly is adapted for placement on top of the receptacle base top panel and includes turf, felt and screen layers.

BRIEF DESCRIPTION OF THE DRAWINGS

FIG. 5 is a front elevational view thereof, showing the cover in a raised position in broken lines.

FIG. 6 is a right-side elevational view thereof.

FIG. 7 is a fragmentary, vertical, cross-sectional view of a hinge taken generally along line 7 in FIG. 4.

FIG. 11 is an upper, perspective view of an alternative, circular turf inset configuration.

FIG. 15 is a bottom plan view thereof.

FIG. 16 is a right-side elevational view thereof.

DETAILED DESCRIPTION OF THE PREFERRED EMBODIMENTS

I. Introduction and Environment

Figure 1:
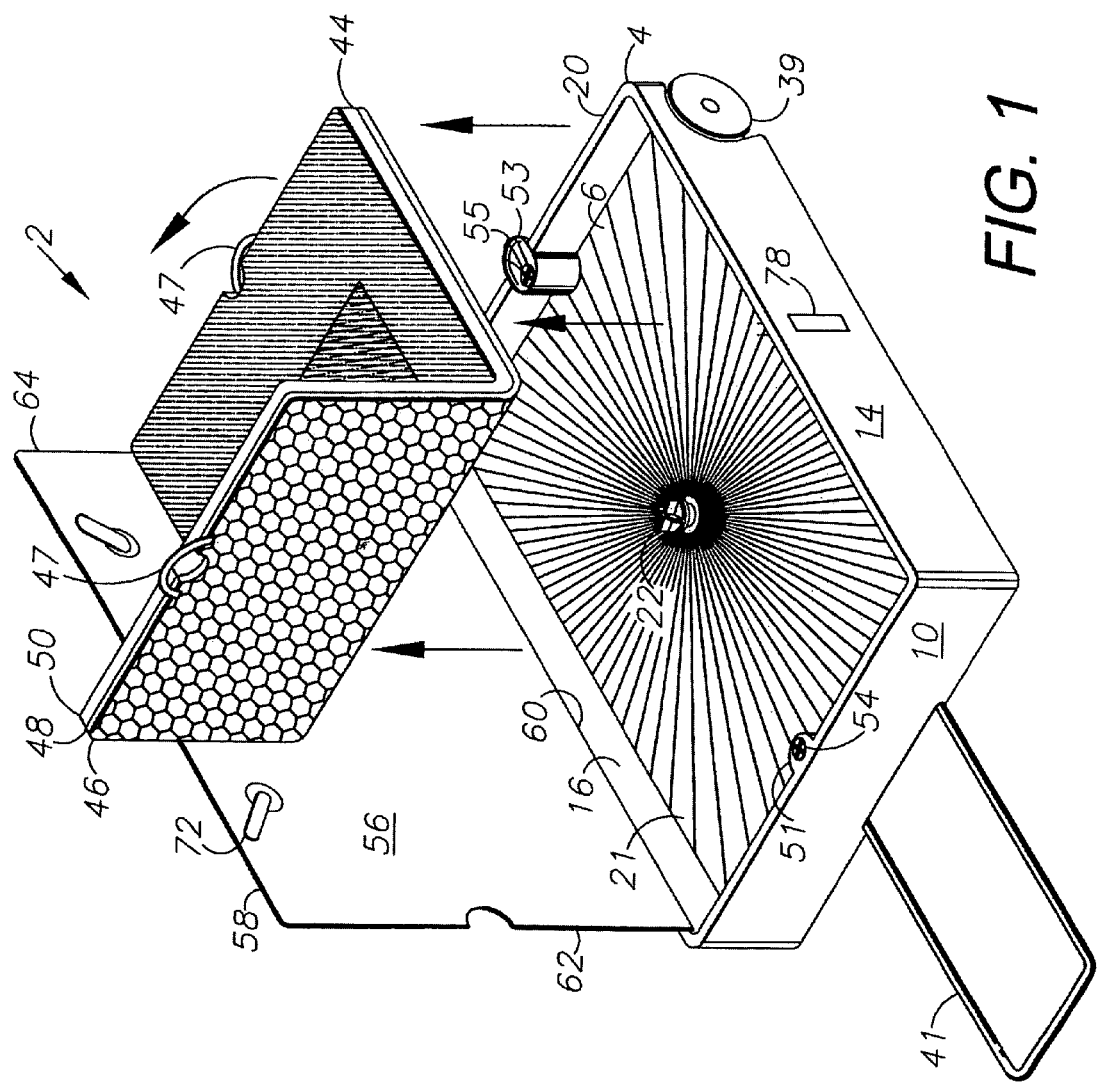
FIG. 1 is an upper, front, left-side perspective view of a waste receptacle embodying the present invention, showing a turf or waste tray assembly thereof being removed and folded.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning.

II. Embodiment or Aspect of the Invention 2

Referring to the drawings in more detail, the reference numeral 2 generally designates a waste receptacle embodying the present invention. Without limitation on the generality of useful applications of the waste receptacle 2, an exemplary application, described herein, is for receiving, storing and discharging waste from small domestic animals, such as cats and dogs. The waste receptacle 2 is scalable and thereby adaptable for animals and residences of various sizes.

The waste receptacle 2 includes a receptacle base 4 with top and bottom panels 6, 8; sidewalls 10, 12; front and back walls 14, 16; and an interior compartment 18 enclosed thereby. A rim 20 is formed by the tops of the walls 10, 12, 14, 16 and extends above the top panel 6 to form an upwardly-open waste receiver 21. An inlet drain assembly 22 includes a female-threaded inlet drain port 24 in the top panel and an inlet drain plug 26 threadably received therein. The drain plug 26 includes a male-threaded, tubular body 28 with upper and lower ends 30, 32. Retaining lugs 34 project radially outwardly from the body lower end 32 and are adapted for limiting upward travel of the drain plug 26 by engaging the inlet drain port 24 at the upper limit of the travel of the drain plug 26. It will be appreciated that various types of stop and interference structures could be provided for restricting upward travel of the drain plug 26. A head 36 is mounted on the drain plug body upper end 30 and includes multiple tabs 38, which facilitate twisting the drain plug 26 for raising and lowering same. An elastomeric washer or gasket 40 is located below the head 36 for engaging the top panel 6 in a sealing relationship with the inlet drain assembly closed (FIG. 8).

Figure 8:
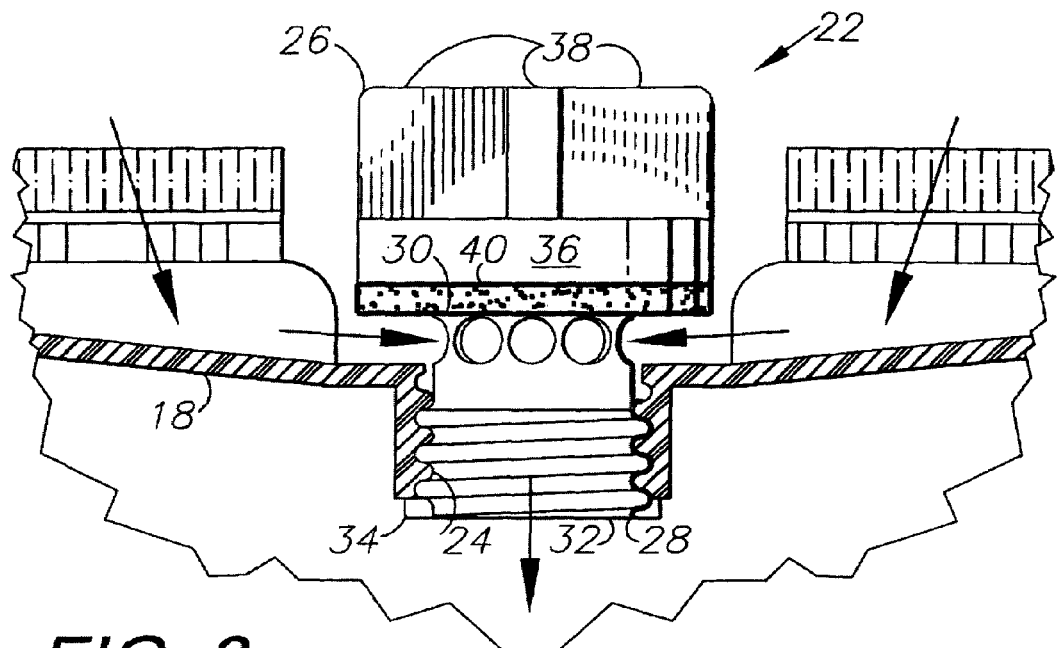
FIG. 8 is a vertical, cross-sectional view taken generally along line 8/9 in FIG. 4 and particularly showing an inlet drain assembly in an open position thereof.
Figure 9:
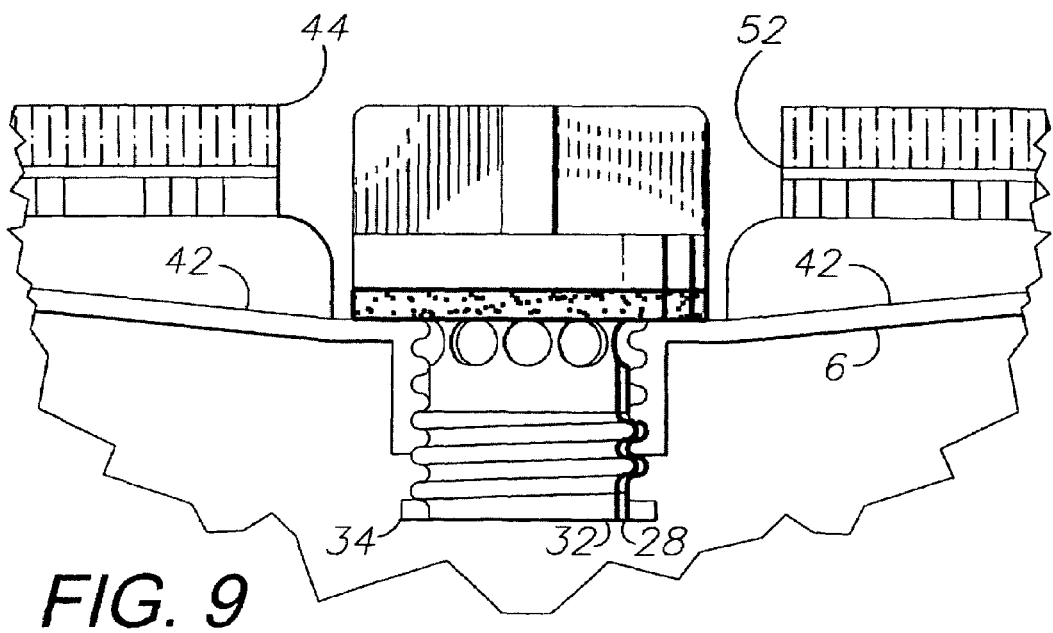
FIG. 9 is a vertical, cross-sectional view taken generally along line 8/9 in FIG. 4 and particularly showing the inlet drain assembly in a closed position thereof.
Figure 10:
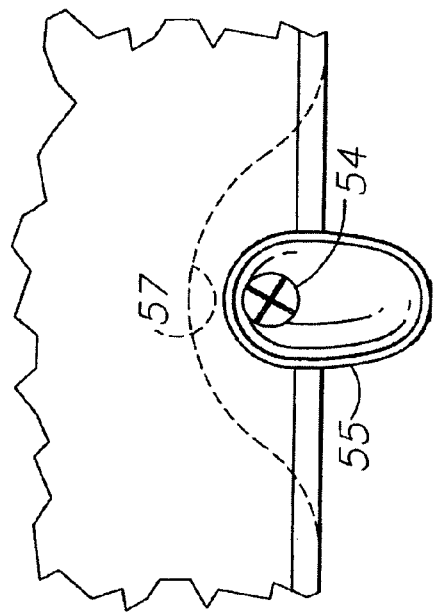
FIG. 10 is a fragmentary, top plan view taken generally along line 10 in FIG. 6 and particularly showing a discharge valve assembly.

The top panel 6 includes multiple channels 42, which extend radially inwardly from the rim 20 to the inlet drain assembly 22 and slope downwardly for liquid drainage through the open inlet drain assembly (FIG. 8). A turf assembly 44 is removably placed in the waste receiver 21 on top of the top panel 6 and includes a screen layer 46, a felt layer 48 and a turf layer 50 with a central opening 52 for receiving the drain plug 26. The turf assembly 44 is preferably flexible whereby it can be folded double upon removal for disposing of solid waste, cleaning, changing the turf layer 50, etc. The layers 46, 48 and 50 comprising the turf assembly 44 are preferably permeable for passing liquid therethrough and trapping solid waste thereon. The screen layer 46 can be provided with handles 47 for removing and transporting the turf assembly 44 with little or no contact with its surfaces. An example of an artificial turf material comprising 50 is produced by SYNLawn, Inc. of Orlando, Fla. The turf assembly 44 can comprise a single layer of, for example, artificial or natural turf placed directly on the receptacle base top panel 6, thus eliminating the screen and felt layers 46, 48. Such a single-layer construction would preferably utilize a permeable turf layer 50.

The receptacle base 4 includes wheels 39 partly recessed into its front and back walls 14, 16 adjacent to the sidewall 12. Optionally, the wheels 39 can be omitted. Also, detachable wheeled structures can be substituted for the wheels 39 for transporting the receptacle 2. The receptacle base 4 is adapted for standing upright on the left sidewall 10, the right sidewall 12, the front wall 14 or the back wall 16. A telescoping, retractable handle 41 extends from the opposite sidewall 10. The sidewalls 10, 12 mount discharge valve assemblies 51, 53, which threadably receive discharge plugs 54 and are adapted to drain or flush the interior compartment 18 with the discharge plugs 54 in their respective open positions. The discharge plugs 54 and the other discharge valve assembly 51, 53 components can be similar to the construction of the drain valve assembly 22. A spout 55 projects outwardly from the side wall 12 adjacent to the discharge valve assembly 53 to facilitate pouring the receptacle base 4 contents into a disposal, such as a toilet. The spout 55 includes a leg 59 at its outer end, which is adapted for hooking the rim of a toilet bowl within positioning the receptacle 2 for discharging its contents into a toilet or other disposal receptacle. The spout leg 59 also supports the receptacle 2 on a flat surface in an upright position, with additional support being provided by the wheels 39. The sidewall 12 has a recess 57, which is adapted to receive the rim of a toilet bowl to facilitate properly positioning the receptacle base 4 for discharging via the spout 55.

Figure 2:
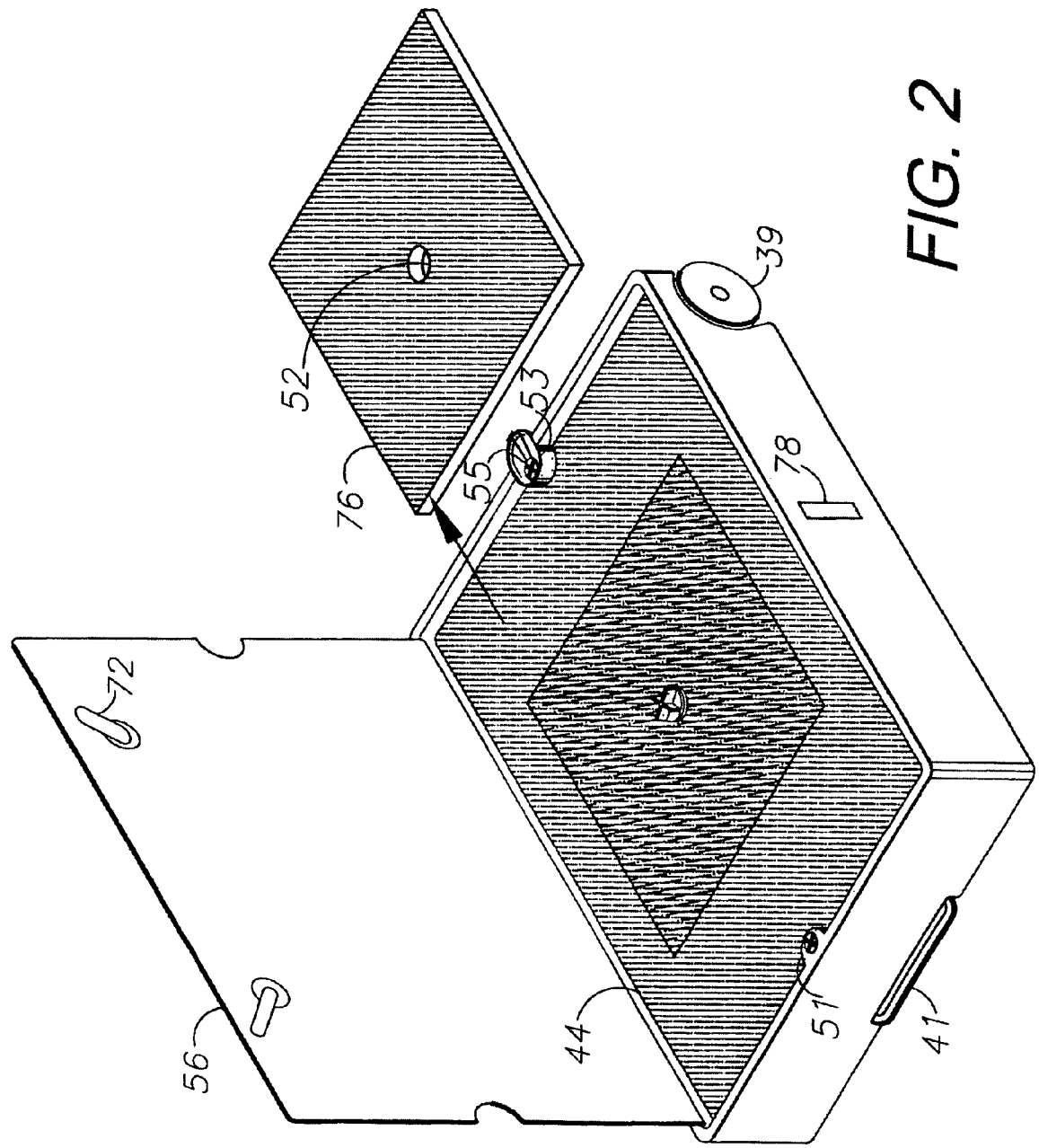
FIG. 2 is another perspective view thereof, particularly showing a removable turf inset feature.
Figure 3:
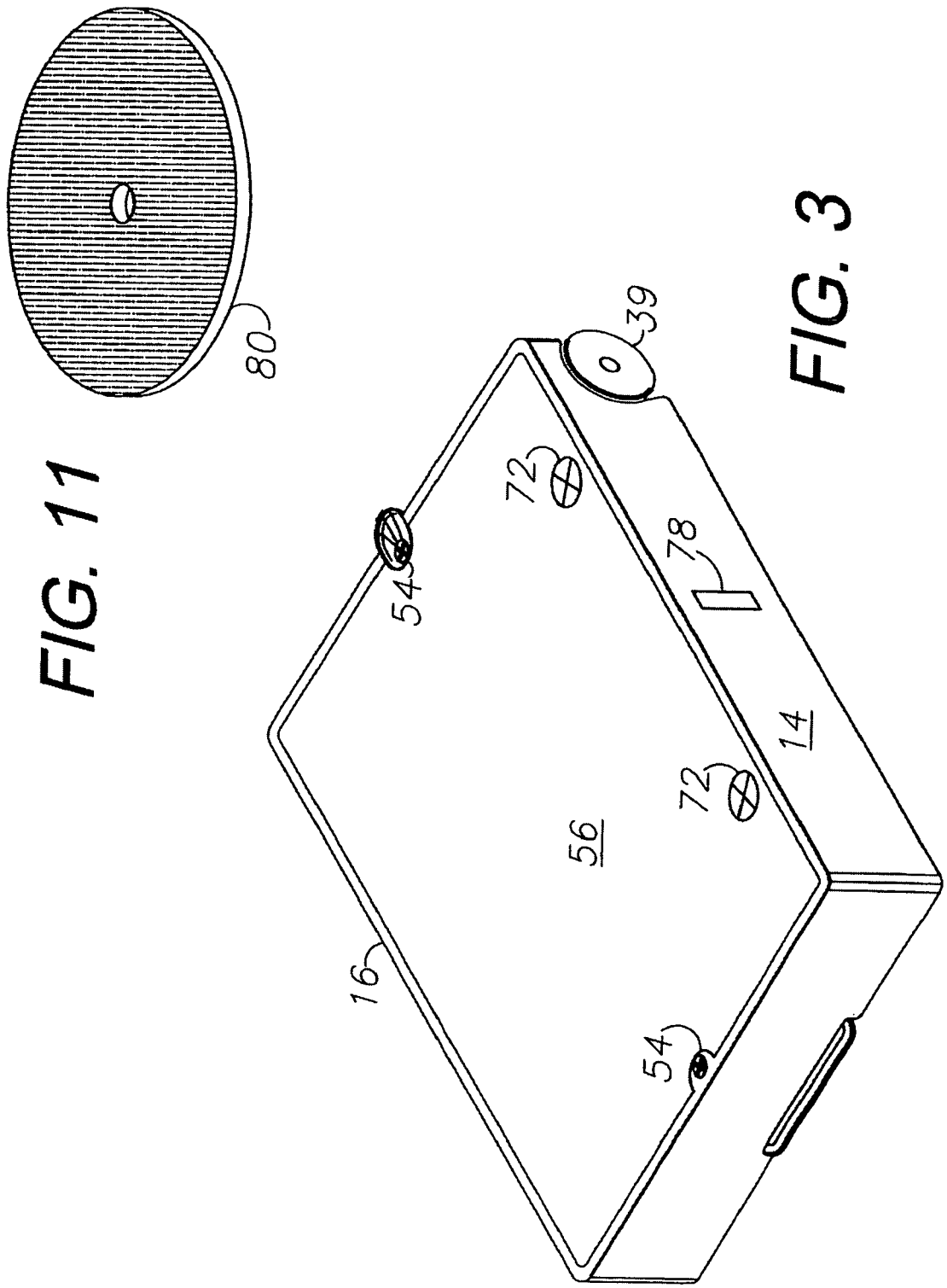
FIG. 3 is another perspective view thereof, particularly showing the waste receptacle in a closed, storage/transport position.
Figure 4:
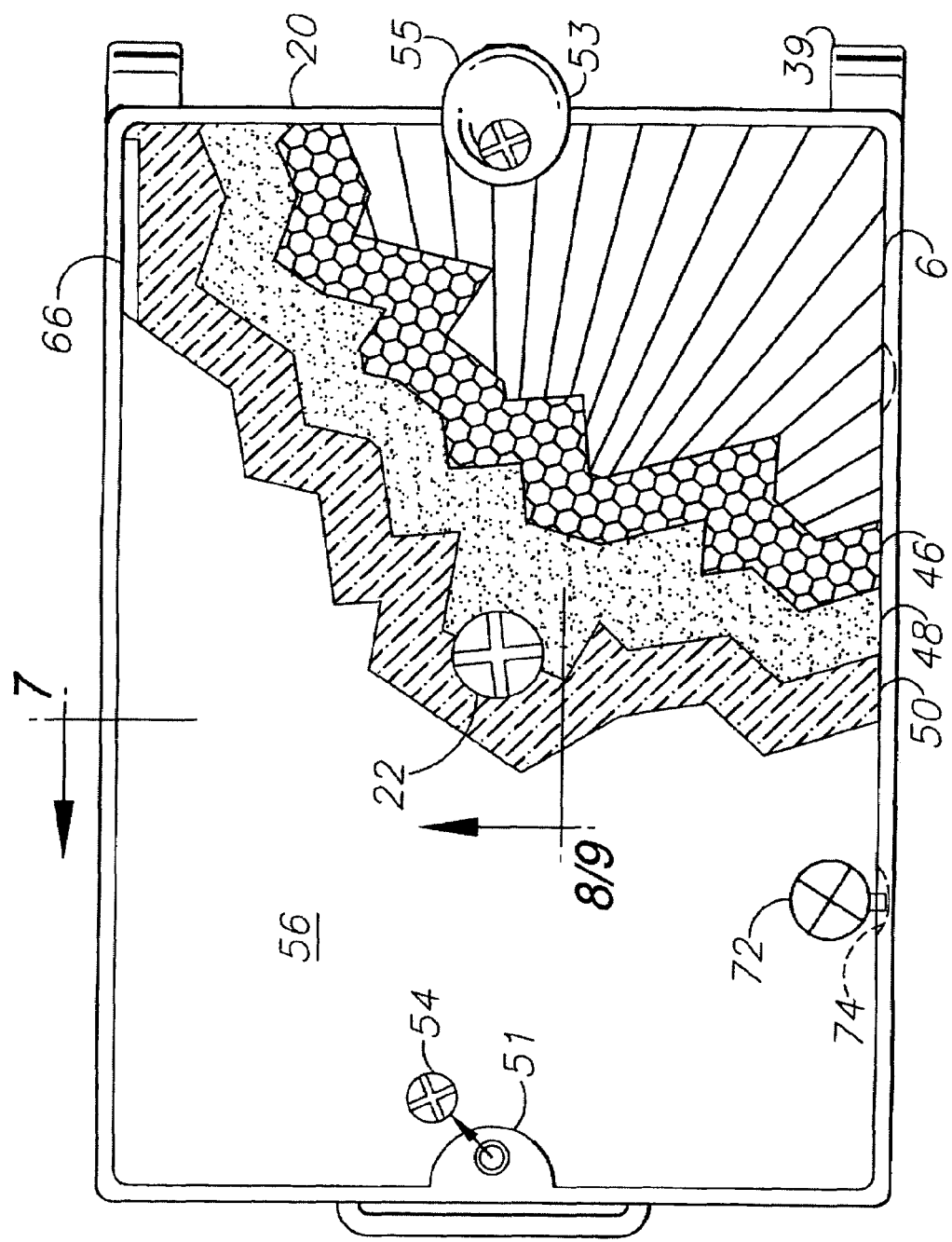
FIG. 4 is a top plan thereof, with portions of the turf or waste tray assembly broken away to reveal internal construction.

A cover 56 includes front, back and opposite side edges 58, 60, 62, 64 and a hinge 66 comprising an upwardly-open channel 68 with drain holes 69 formed in the rim 20 at the top of the back wall 16 and a hinge shaft 70 formed at the cover back edge 60 and rotatably received in the channel 68. The hinge shaft 70 can be snapped into the channel 68 for expediting removal of the cover 56. The hinge 66 permits the cover 56 to move between a closed, generally horizontal position (FIG. 3) and an open, generally vertical position (FIGS. 1 and 2), i.e. through about 90°. The hinge 66 can have a relatively tight interference fit for maintaining the cover 56 in its open position, or other suitable mechanisms, such as braces, can be utilized for propping the cover 56 open. The cover 56 is provided with a pair of latches 72 located in proximity to its front edge 58 and adapted for selectively engaging slots 74 formed in the front wall 14 whereby the cover 56 can be secured in a closed position over the turf assembly 44. The hinge 66 can be configured to allow the cover 56 to swing through approximately 180° to horizontal or slightly-sloping position, thus effectively doubling the surface area of the waste receptacle 2 in its open position.

In operation, the waste receptacle 2 can be placed in a suitable indoor or outdoor location for access by a domestic animal. The cover 56 can be oriented vertically or removed, depending upon the preferences of the animal or animals using the waste receptacle 2. A turf inset 76 can be removably installed in the central area of the turf layer 50 and can comprise a suitable material. For example, natural turf can be utilized for the inset 76 in order to train an animal to utilize the waste receptacle 2 in lieu of a natural, grass-covered area. When appropriate, the natural turf inset 76 can be replaced by an artificial turf inset. The inset 76 and the drain plug 26 can be treated with Pheromones or other animal-attractants in order to encourage animals to use the waste receptacle 2. The drain plug is placed in its open position (FIG. 8). A clear plastic level indicator 78 is set into the front wall 14 for providing an external visual reference indicating the level of liquid in the receptacle base interior compartment 18. When the liquid reaches a certain predetermined level indicating a full compartment 18, the waste receptacle 2 should be emptied. The contents of the compartment 18 can be discharged through either discharge valve assembly 51, 53. Optionally, a manual or electric discharge pump 82 can be placed in the interior compartment 18 for discharging the contents thereof through a discharge line 84 to the exterior of the waste receptacle 2 (FIG. 6).

The base 4 can be substantially closed by closing the drain inlet assembly 22 and the discharge valve assemblies 51, 53. The cover 56 can be closed and latched whereby the receptacle 2 is configured for transport and storage. The drain plug 26 preferably protrudes above the level of the turf layer 50 and the rim 20 in its open position whereby it would interfere with closing the cover 56. This configuration can provide a reminder to close the drain inlet assembly 22 (FIG. 8) prior to closing the cover 56. The waste receptacle 2 can be used to advantage when traveling with a pet and in locations where access to natural grass is not readily available, such as apartments, hotels, high-rise commercial buildings, etc.

The turf assembly 44 can be removed for cleaning or replacement. The liquid-permeable construction of the turf assembly 44 facilitates passing liquid waste into the receptacle compartment 18 while trapping solid wastes for convenient disposal. The components of the receptacle 2 can be rinsed out, hosed down and otherwise suitably cleaned, disinfected and treated with odor-neutralizing antiseptic cleaners, which can be added to the turf assembly 44 and the compartment 18 as needed.

An alternative, circular configuration turf assembly inset 80 is shown in FIG. 11, and is adapted for placement in the turf layer 50 as described above in connection with the turf inset 76.

III. Alternative Embodiment or Aspect of the Invention 102

Figure 12:
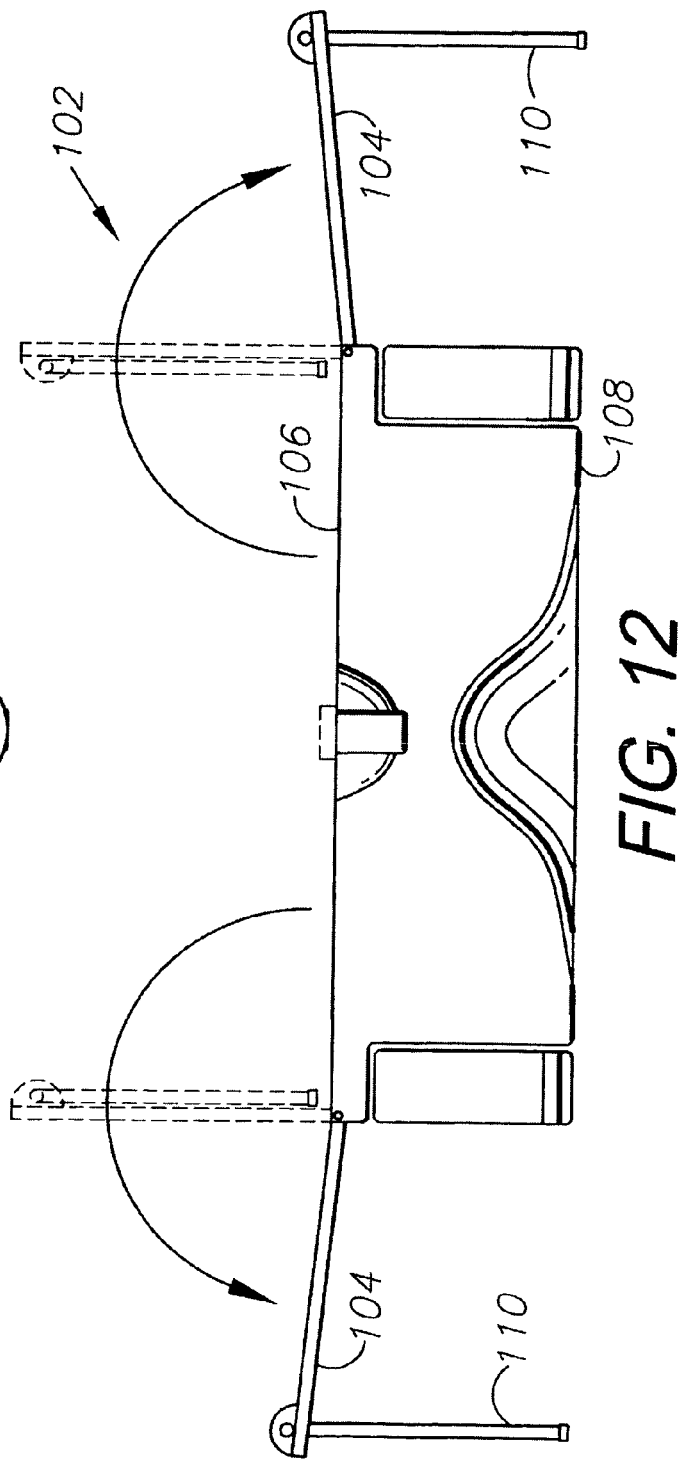
FIG. 12 is a right-side elevational view of an alternative embodiment waste receptacle with a pair of covers.

An alternative configuration waste receptacle 102 is shown in FIG. 12 and includes a pair of covers 104, each of which is adapted to swing through approximately 180° between a closed position substantially flush with a base rim 106 and an open position with a slight slope towards a base 108 of the receptacle 102. Folding legs 110 are provided on each cover 104, and are adapted for folding between open, supporting positions (solid lines in FIG. 12) and closed, folded positions (dashed lines in FIG. 12). Either of the covers 104 can be vertically oriented for pets, particularly male dogs, to urinate against. The covers 104 can be positioned at various flat, vertical or sloping positions throughout their respective ranges of motion.

IV. Alternative Embodiment or Aspect of the Invention 152

Figure 13:
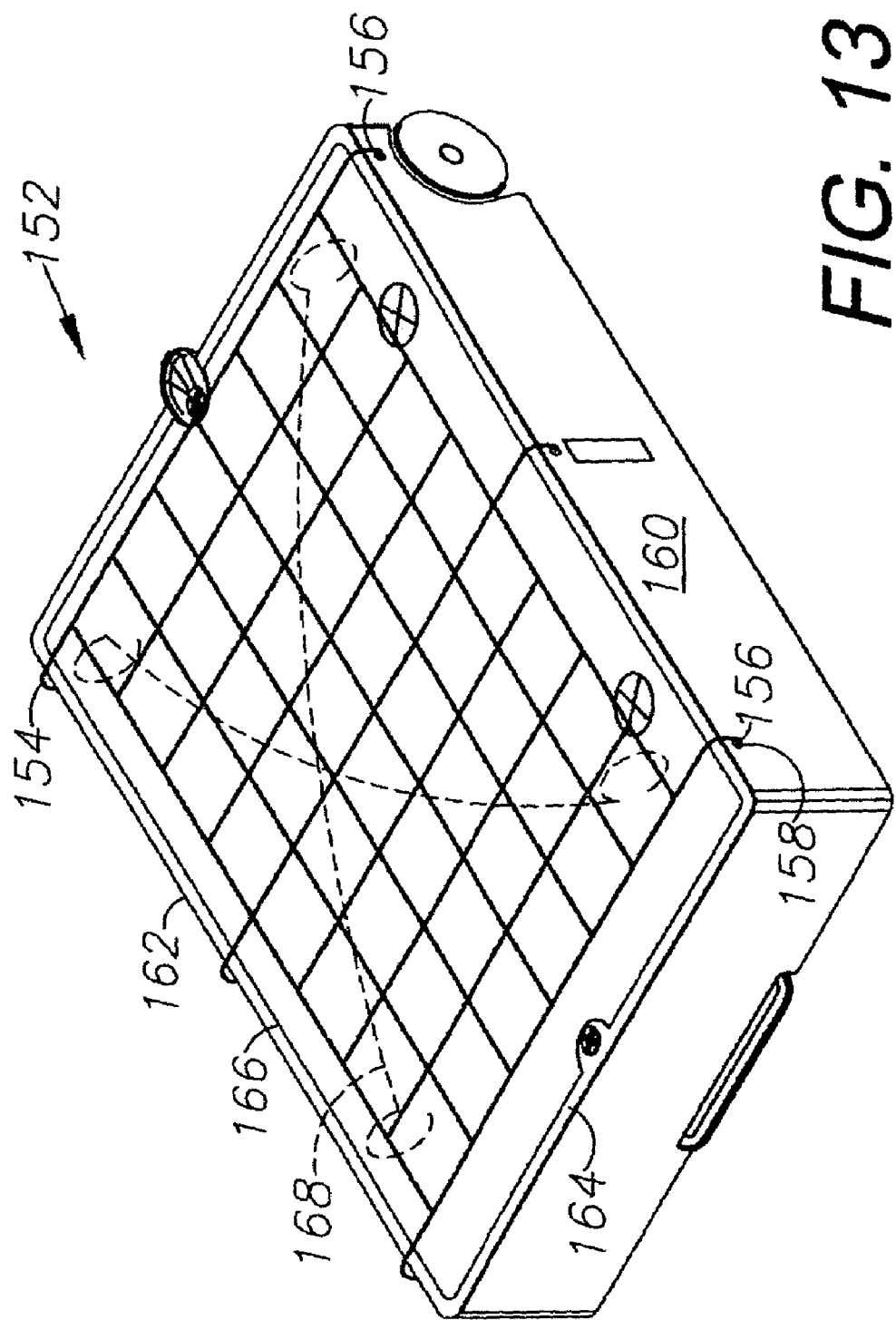
FIG. 13 is an upper, front, left-side perspective view of another alternative embodiment waste receptacle with an optional cargo rack removably mounted over the cover.
Figure 14:
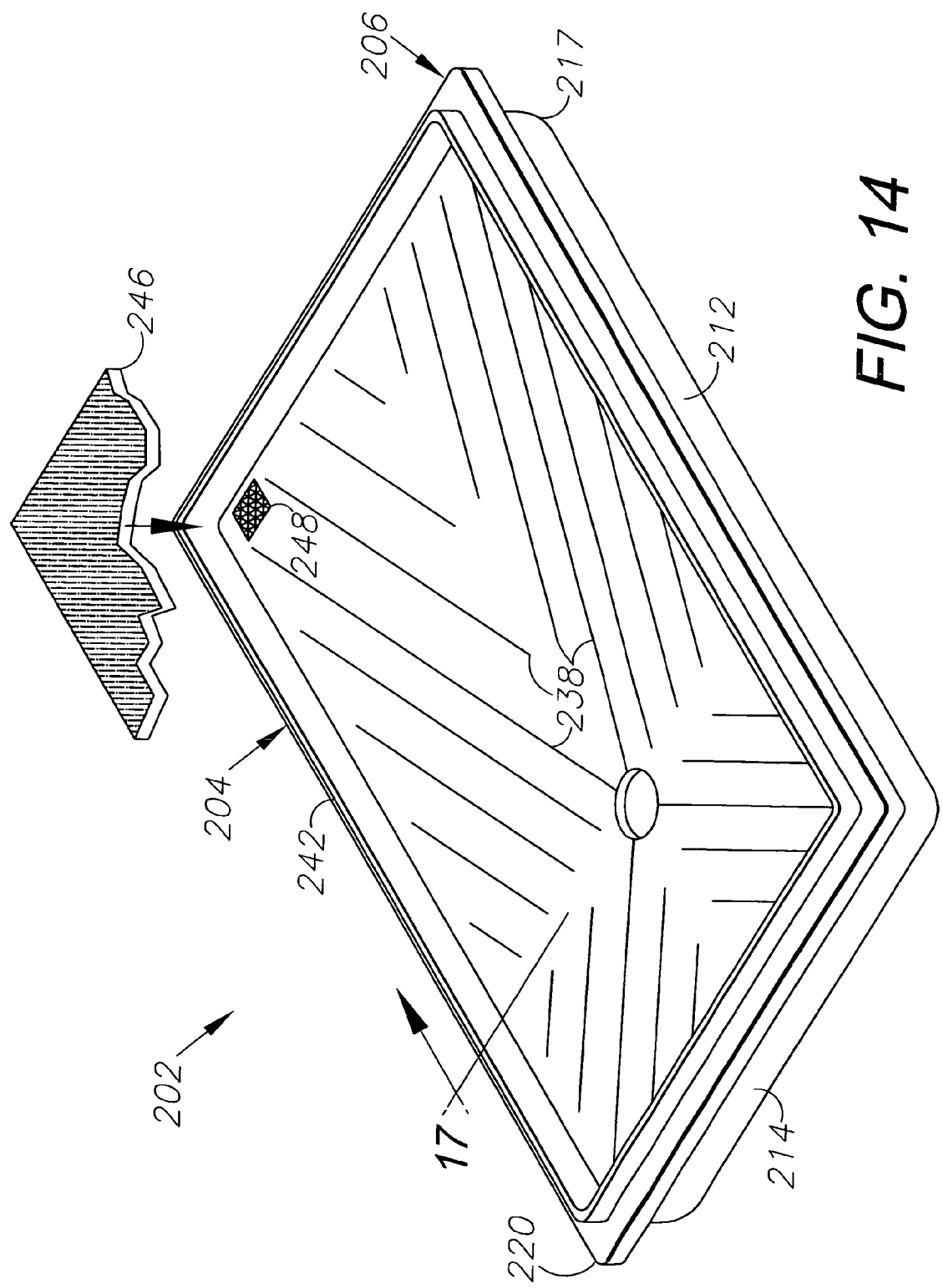
FIG. 14 is an upper, front, right-side perspective view of another alternative embodiment waste receptacle.

FIG. 13 shows a waste receptacle 152 comprising another alternative embodiment of the present invention and mounting a cargo rack 154, which can be formed in a grid-like configuration and constructed of chrome-plated or stainless steel wire, or some other suitable material. The rack 154 includes pins 156, which are adapted for removable placement, e.g. by flexing the rack 154, in receivers 158 formed in front and back walls 160, 162 in proximity to a rim 164. The receivers 158 can be preformed in the front and back walls 160, 162, and punched out by a user as needed for mounting the rack 154. The rack 154 is adapted for mounting various items, such as pet care products, accessories and the like. Items mounted on the rack 154 can be secured by suitable straps, such as bungee cords 168 or elastic straps, which can be hooked into the grid formed by the rack 154. Alternatively, the rack 154 can be omitted and bungee cords and elastic straps can be hooked directly into the receivers 158 for securing items onto a cover 166 of the waste receptacle 152. Still further, a cargo-type net can be mounted on the waste receptacle 152 over the cover 166 using the receivers 158.

III. Alternative Embodiment or Aspect of the Invention 202

A waste receptacle 202 comprising yet another aspect or embodiment of the present invention is shown in FIGS. 14-19, and includes a receptacle base 204 with a top 206, a bottom panel 208, a left sidewall 210, a right sidewall 212, a front wall 214 and a back wall 216. The bottom panel 208 and the walls 210, 212, 214, 216 form a waste pan 217 and are preferably manufactured from a thermoplastic material, for example by a vacuum forming or other suitable process. A waste pan lip 218 as formed at the tops of the walls and is configured for placement in a corresponding top lip 220 whereby the top 206 can be mounted on the waste pan 217. The lips 218, 220 can be sealingly secured together by a suitable adhesive, by welding, by mechanical fasteners such as rivets 222 or by other suitable attachment means. A bead of sealant or a gasket can be placed therebetween to affect a fluid-tight seal.

The bottom panel 208 includes reinforcing ribs 209 and roller receivers 224 in proximity to the back wall 216 for mounting detachable rollers 226. A drain 228 is provided in the back wall 216 and includes a detachable cap 230. A drain or drains can be provided at alternative locations on the receptacle base 204. The base 204 includes a support column 232, which extends upwardly from the bottom panel 208 and provides support for the top panel 206.

The top 206 includes a top panel 234 with a drain opening 236 located approximately midway between the sidewalls 208, 210 and relatively close to the front wall 214. The top panel 234 slopes downwardly to the drain opening 236 for positive drainage and includes multiple ribs 238 for reinforcing and improved stiffness for supporting the weight of an animal on the receptacle base 204. The opening 236 includes an annular opening flange 240 projecting downwardly into the interior of the waste pan 217.

Figure 17:
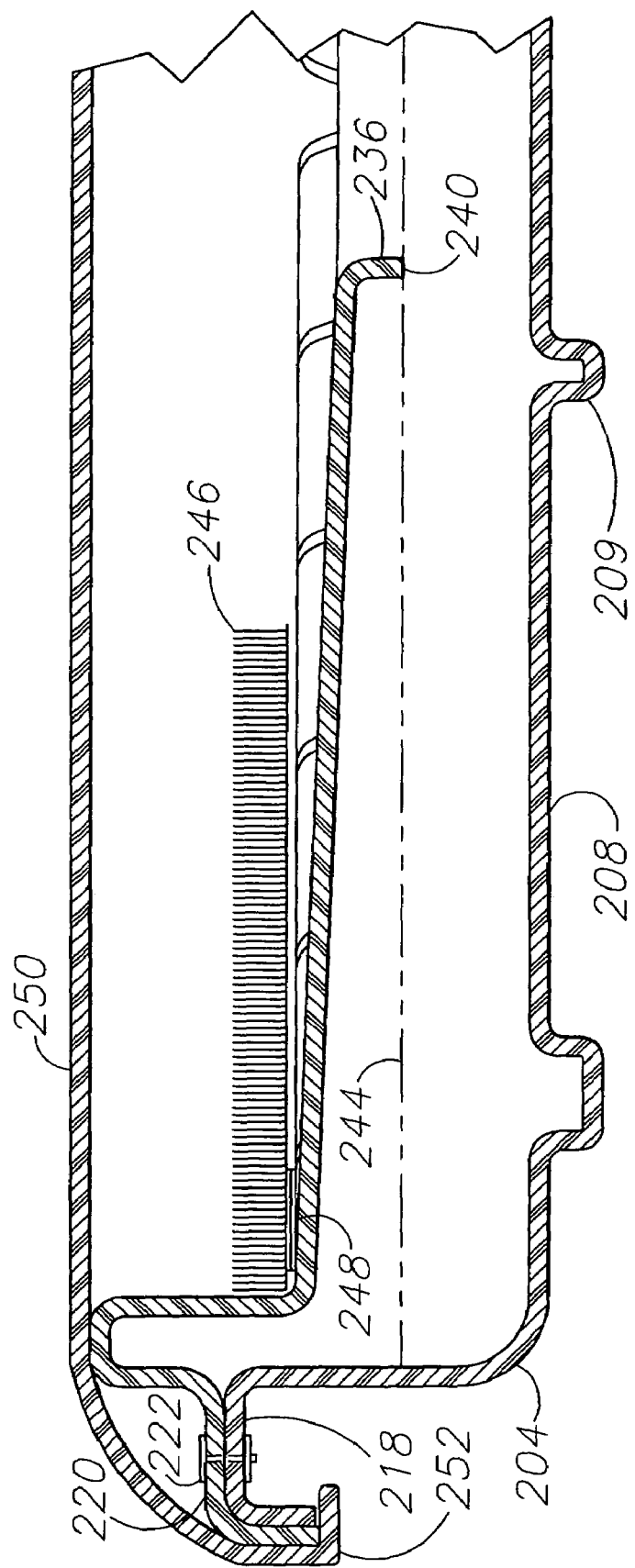
FIG. 17 is an enlarged, fragmentary, cross-sectional view thereof, taken generally along line 17 in FIG. 14.
Figure 18:
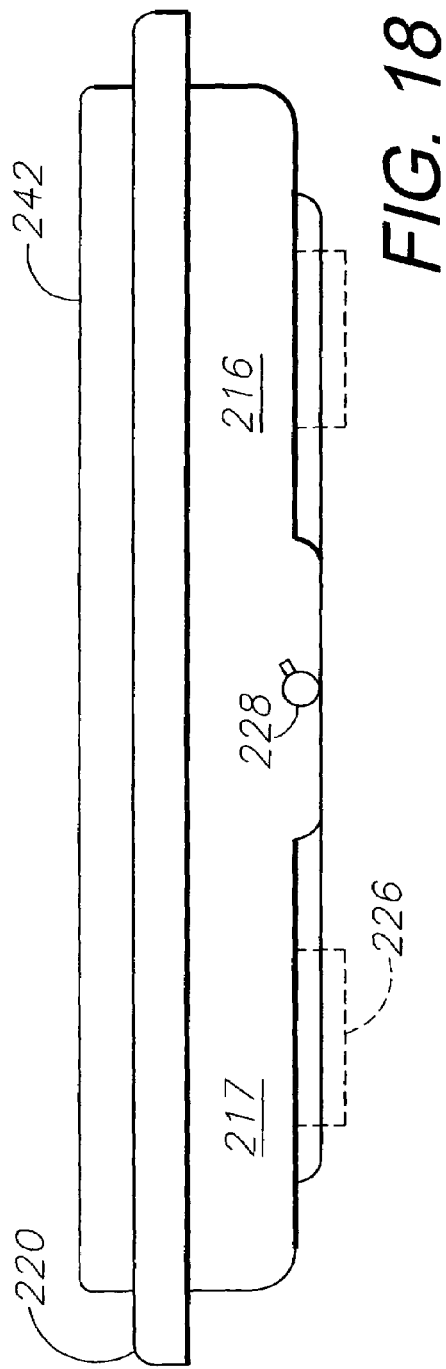
FIG. 18 is a rear elevational view thereof.
Figure 19:
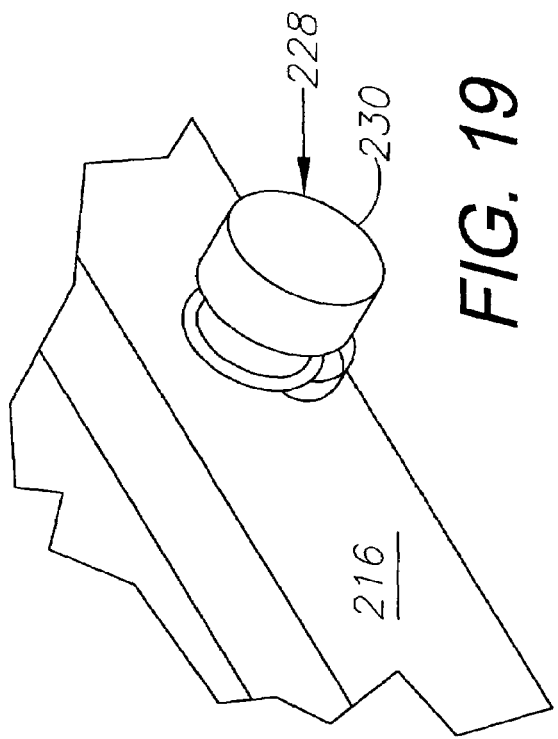
FIG. 19 is an enlarged, fragmentary, perspective view of a discharge drain thereof.

The top 206 includes a rim 242 projecting upwardly from the top panel 234 and mounting the top lip 220, which projects outwardly from the rim 242. As shown in FIG. 17, the configuration of the top 206 tends to trap air above a liquid level 244, which is generally located at the lower edge of the drain opening flange 240. For example, the slope of the top panel 234 and the hollow top rim 242 provide air pockets and vapor traps. In operation, the waste receptacle 202 traps fluid (e.g., animal urine) whereby spillage from overflow can generally be avoided, even with the waste receptacle 202 stood up on its back wall 216 for transport or draining through the discharge drain 228. The inlet drain opening 236 can be closed with a suitable plug or stopper, but is positioned in proximity to the front wall 214 such that the liquid level is below the inlet drain opening 236 with the waste receptacle 202 stood up on its back wall 216.

A suitable waste tray assembly 246 can comprise, for example, artificial turf, and is placed on the top panel 234 in covering relation thereover and secured by suitable hook-and-loop fasteners 248. The waste tray assembly 246 can also comprise a construction such as the turf assembly 44 described above, or natural turf. An optional lid 250 includes a lid flange 252, which is adapted for snapping over the flange waste pan and top lips 218, 220 respectively.

It is to be understood that the invention can be embodied in various forms, and is not to be limited to the examples discussed above. Other components and configurations can be utilized in the practice of the present invention. For example, waste receptacles embodying aspects of the present invention can be scaled to a wide range of appropriate sizes, and can be manufactured from a wide range of suitable materials utilizing appropriate manufacturing procedures.

Having thus described the invention, what is claimed as new and desired to be secured by Letters Patent is:

1. A waste receptacle, which includes:
   a receptacle base including a top, a bottom panel, opposite sidewalls, a front wall and a back wall, said walls extending between said top and said bottom panels;
   said bottom panel and said walls forming a waste pan with a configuration adapted for nesting with other waste receptacles;
   said walls including a waste pan lip;

said top including a top panel, a rim and a top lip mounted on said waste pan lip;

said top panel including an interior portion with an inlet drain opening located in proximity to said front wall;

a waste tray assembly removably placed on said top panel;

said waste pan and top lips being connected by at least one of the group comprising: adhesive, sealant, welding and mechanical fasteners;

said bottom panel including multiple longitudinally-extending stiffening ribs;

said top panel including multiple stiffening ribs, at least some of which extend generally radially from said inlet drain opening towards said top rim;

said top panel sloping downwardly towards said inlet drain opening;

said bottom panel including a pair of roller receivers each located in proximity to said back wall and a respective sidewall;

a pair of rollers each mounted on said bottom panel in a respective roller receiver;

said waste pan including a discharge drain located in one of said walls and including a drain cap with open and closed positions for respectively opening and closing said discharge drain;

said rim having a hollow construction;

a drain opening flange depending downwardly from said top panel into an interior of said receptacle base and having a lower edge;

air pockets formed by said rim and said receptacle base top panel and a level of liquid in said receptacle base at or above the lower edge of said inlet drain opening flange whereby vapor is trapped in said air pockets;

a lid with a lid perimeter flange adapted for capturing said lips whereby said lid is secured on said top; and said waste tray assembly comprising artificial turf and hook-and-loop fasteners attached to and removably mounting said artificial turf on said top panel.

* * * * *